United States Patent
Machino et al.

[11] Patent Number: 5,619,307
[45] Date of Patent: Apr. 8, 1997

[54] METHOD OF PRINTING TEST PATTERN AND APPARATUS FOR OUTPUTTING TEST PATTERN

[75] Inventors: Hitoshi Machino, Tokyo; Koichi Ohtaka, Kawasaki; Masako Takahashi; Atsuya Takahashi, both of Yokohama; Nobuyuki Kinoshita, Yamato, all of Japan

[73] Assignee: Cannon Kabushiki Kaisha, Tokyo, Japan

[21] Appl. No.: 498,873

[22] Filed: Jul. 6, 1995

[30] Foreign Application Priority Data

Jul. 7, 1994 [JP] Japan .................................. 6-155788
Mar. 29, 1995 [JP] Japan .................................. 7-071677

[51] Int. Cl.$^6$ ........................................... G03G 21/00
[52] U.S. Cl. .................................. 399/11; 399/72
[58] Field of Search ........................ 355/203–207, 355/202, 200

[56] References Cited

U.S. PATENT DOCUMENTS

| | | | |
|---|---|---|---|
| 4,335,952 | 6/1982 | Conly et al. | 355/203 |
| 4,536,079 | 8/1985 | Lippolis et al. | 355/206 |
| 4,553,830 | 11/1985 | Nguyen | 355/206 X |
| 5,210,571 | 5/1993 | Peloquin et al. | 355/203 |
| 5,365,310 | 11/1994 | Jenkins et al. | 355/200 X |

*Primary Examiner*—Matthew S. Smith
*Attorney, Agent, or Firm*—Fitzpatrick, Cella, Harper & Scinto

[57] ABSTRACT

It is an object of the present invention to provide an apparatus and method which allow a service engineer to accurately analyze the situation of a printer and specify a failure when he or she arrives at the place where the printer is installed. A computer predicts a failure from the status information of a printer, and transmits a test pattern corresponding to the failure to the printer via a controller. The computer then outputs an indication of print out. The service engineer can accurately analyze the failure because the test pattern has already been printed out upon occurrence of the failure.

16 Claims, 15 Drawing Sheets

FIG. 14A

OCTOBER 5, 1994 14:45 No.23456
THIS IS TEST PATTERN FOR CHECK
OF CONVEYING ROLLER, etc
REFERENCE 03-3758-xxxx
0123456789abcdefghijklmnopqrstuvwxyz!@#$%^&*().
ABCDEFGHIJKLMNOPQRSTUVWXYZ=/"-+

FIG. 14B

OCTOBER 5, 1994 14:45 No.34567
THIS IS TEST PATTERN FOR CHECK
OF CONVEYING ROLLER, etc
REFERENCE 03-3758-xxxx
0123456789abcdefghijklmnopqrstuvwxyz!@#$%^&*().
ABCDEFGHIJKLMNOPQRSTUVWXYZ=/"-+

SITUATION OF ACTION

DETAILS OF DISPLAY CONTENTS

OCTOBER 5, 1994 14:45 No.12345
THIS IS TEST PATTERN FOR HIGH
VOLTAGE CHECK
REFERENCE 03-3758-xxxx 0123456789abcdefghijklmnopqrstuvwxyz!@#S%^&*(),./
ABCDEFGHIJKLMNOPQRSTUVWXYZ=/*-+

FIG. 16

METHOD OF PRINTING TEST PATTERN AND APPARATUS FOR OUTPUTTING TEST PATTERN

BACKGROUND OF THE INVENTION

1. Field of the Invention

The present invention relates to a method of printing a test pattern and an apparatus for outputting a test pattern.

2. Related Background Art

A maintenance service system for copying machines and the like is being realized. In this system, a computer connected to a copying machine or the like acquires the status information of the copying machine and displays the information on the display. A service engineer sees the information and goes to the site of the copying machine to perform required maintenance services.

It takes time, however, for the service engineer to go out to the place where the copying machine is installed and make the machine print a test pattern corresponding to the status information. In addition, if the user has operated the copying machine several times before the service engineer arrives, the status information of the copying machine, which the service engineer has obtained from the computer, is different from the status information of which a test pattern printed out upon arrival of the service engineer is based, because these pieces of information are acquired under different operation conditions at different times. For this reason, it is difficult to specify an abnormality. This applies to printers and the like as well as copying machines.

SUMMARY OF THE INVENTION

It is an object of the present invention to provide a method of printing a test pattern and an apparatus for outputting a test pattern, which method and apparatus can solve the above problem.

It is another object of the present invention to provide a method and apparatus for printing a test pattern corresponding to a diagnosed abnormality.

According to one aspect of the invention, these objects are achieved by means of a method of printing a test pattern, in which, first, a type of abnormality in a printer is determined based on status information relating to the printer, after which the printer is caused to print out a test pattern corresponding to the determined type of abnormality.

According to another aspect, the invention achieves these objects by providing an apparatus for outputting a test pattern, which has means for determining a type of abnormality in a printer based on status information from the printer, and means for transmitting a test pattern corresponding to the type of abnormality determined by the determining means, and causing the printer to print out the test pattern.

The above and other objects, features, and advantages of the present invention will be apparent from the following detailed description in conjunction with the accompanying drawings and the appended claims.

BRIEF DESCRIPTION OF THE DRAWINGS

FIGS. 14A and 14B are views showing halftone patterns as test patterns used in the third embodiment;

FIG. 16 is a view showing a test pattern used in the fourth embodiment; and

DETAILED DESCRIPTION OF THE PREFERRED EMBODIMENTS

First Embodiment

Figure 1:
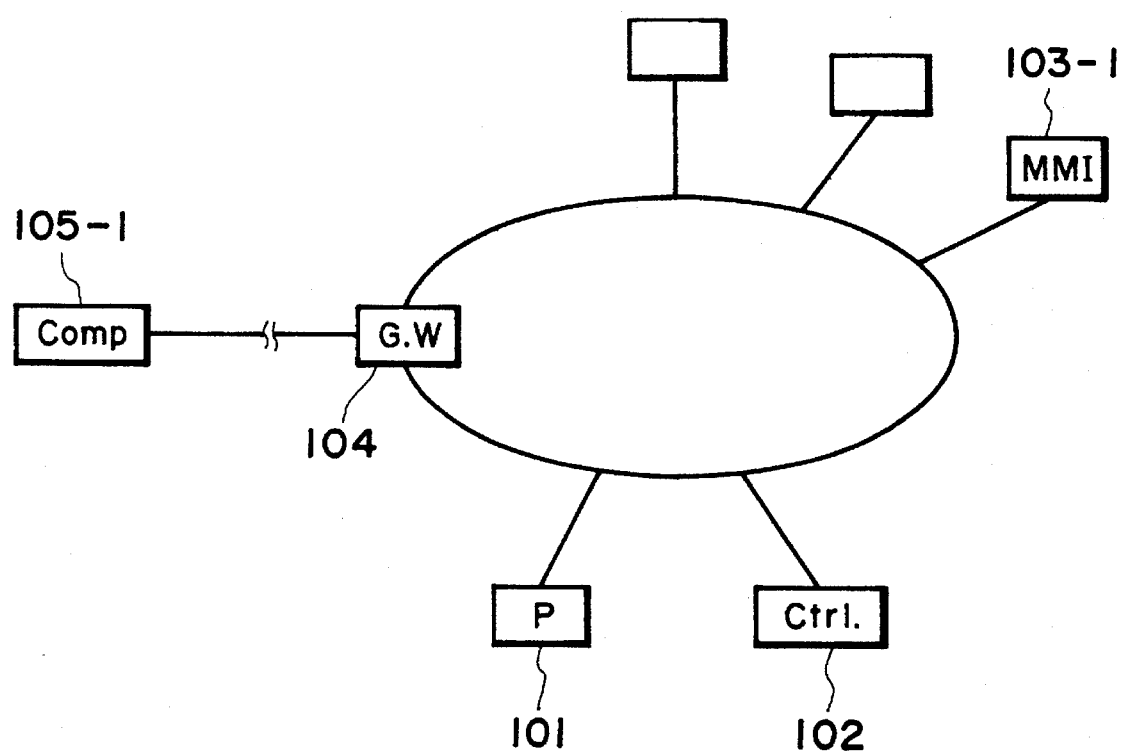
FIG. 1 is a block diagram showing the first embodiment of the present invention.

FIG. 1 shows an image forming system according to the first embodiment of the present invention. Referring to FIG. 1, the system includes a laser printer 101 of the electrophotographic scheme, and a controller 102 serving as a host unit for the printer. The controller 102 communicates printer information and the like with the printer 101 and a computer 105-1 (to be described later). A man-machine interface (to be abbreviated to MMI) 103-1 outputs an indication to the printer 101, and displays the situations of the components of the image forming system including the printer 101 and the like.

A gateway 104 constitutes a contact point between a service center and a LAN (local area network) for linking the above components (101 to 103-1) and the like. The computer 105-1 is a computer in the service center. The computer 105-1 predicts or diagnoses a failure in the printer 101. A telephone exchange unit may be used instead of the gateway 104, and the telephone exchange unit may be connected to the computer 105-1 via a telephone line.

Figure 2:
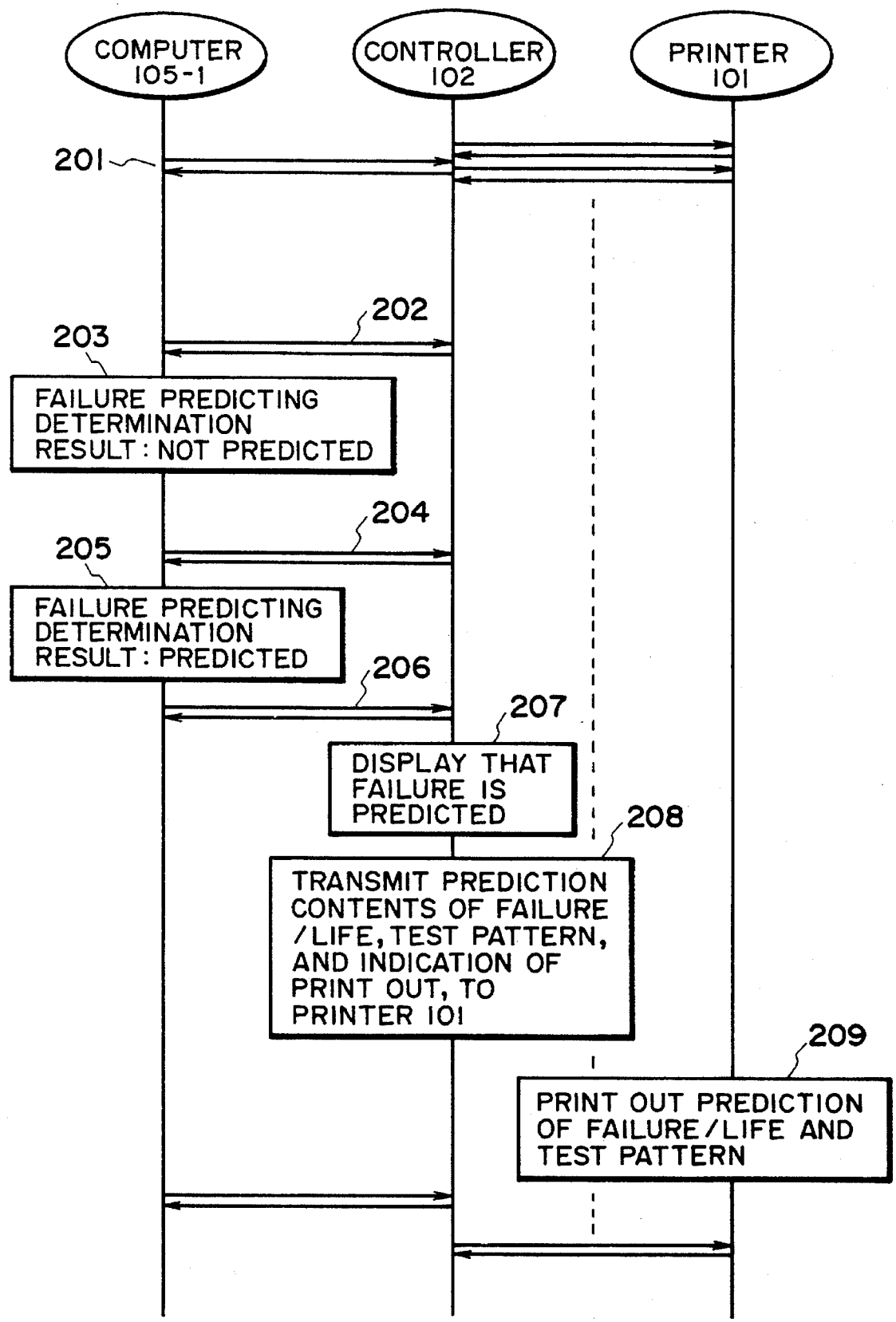
FIG. 2 is a view showing an example of communication between a computer, a controller and a printer in the first embodiment.

FIG. 2 shows how communication is performed between the computer 105-1, the controller 102, and the printer 101. Communication is constantly and continuously performed between the controller 102 and the printer 101. For this reason, the controller 102 always acquires the status information of the printer 101. Communication of the status information of the printer 101 is performed periodically, e.g., every hour, between the computer 105-1 and the controller 102. Communication between the computer 105-1 and the controller 102 will be described below.

In handshake processing in step 201, no status regarded as a symptom of a failure has occurred in the printer 101. In step 202, upon reception of a status regarded as a symptom of a failure from the controller 102, the computer 105-1 performs failure predicting determination (to be described in detail later with reference to FIG. 4). At this time, a failure has not been predicted yet (step 203). In handshake processing in step 204, a status regarded as a symptom of a failure is informed. In this case as well, failure predicting determination is performed. As a result of this determination, a failure is predicted (step 205).

If a failure is predicted, the computer 105-1 immediately performs communication with the controller 102 at any time to inform the controller 102 that a failure has been predicted (step 206). Upon reception of this information, the controller 102 causes the MMI 103-1 to display that a failure has been predicted, thereby informing the user of this prediction (step 207).

Figure 6:
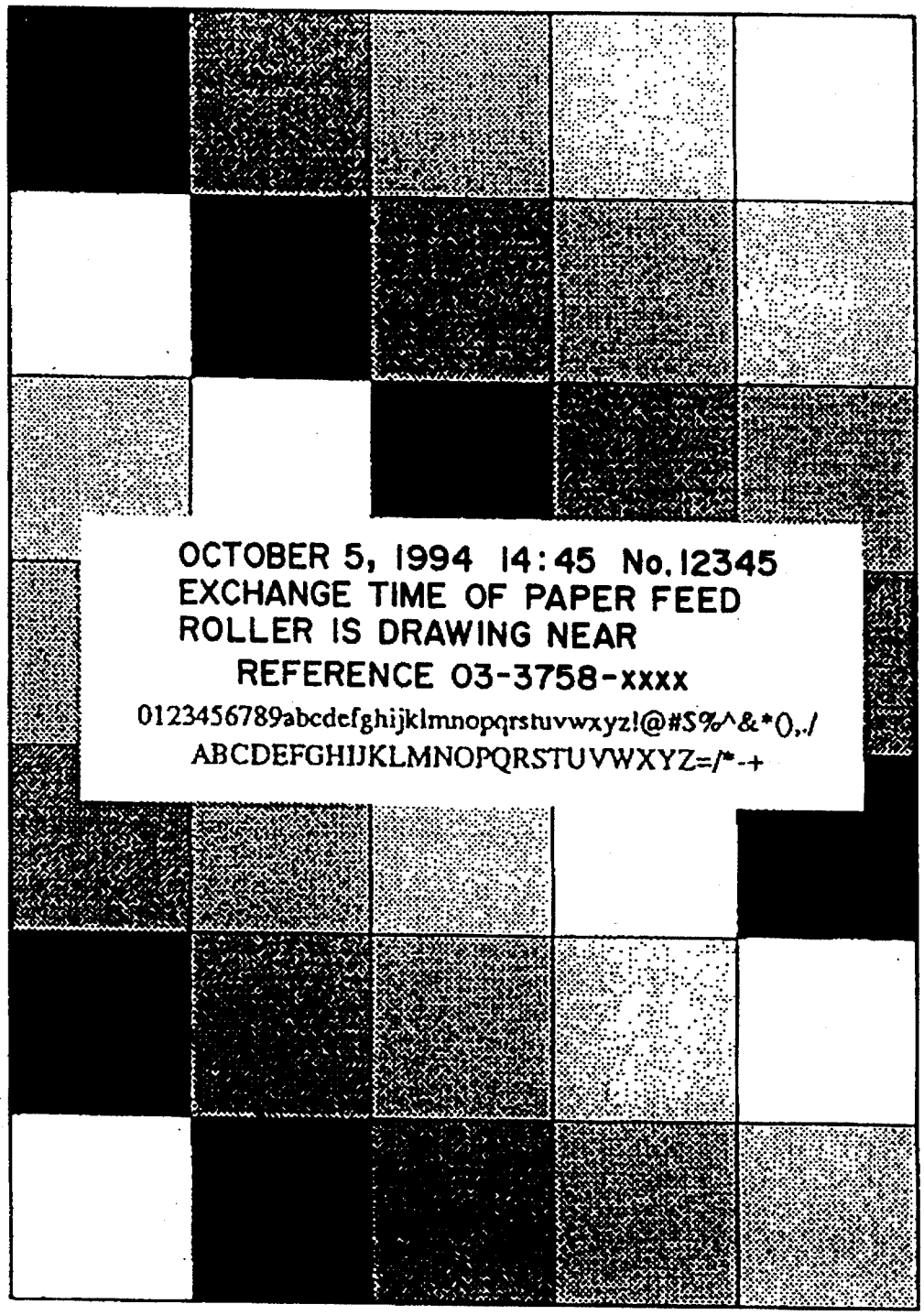
FIG. 6 is a view showing a test pattern used in the first embodiment.

In addition, the controller 102 transmits characters indicating the prediction contents of the failure, image data representing a test pattern required to analyze the failure, and command data as an indication of print out to the printer 101 (step 208). The printer 101 generates and prints out the contents of the predicted failure and an image including a predetermined test pattern, as shown in FIG. 6 (step 209).

Figure 3:
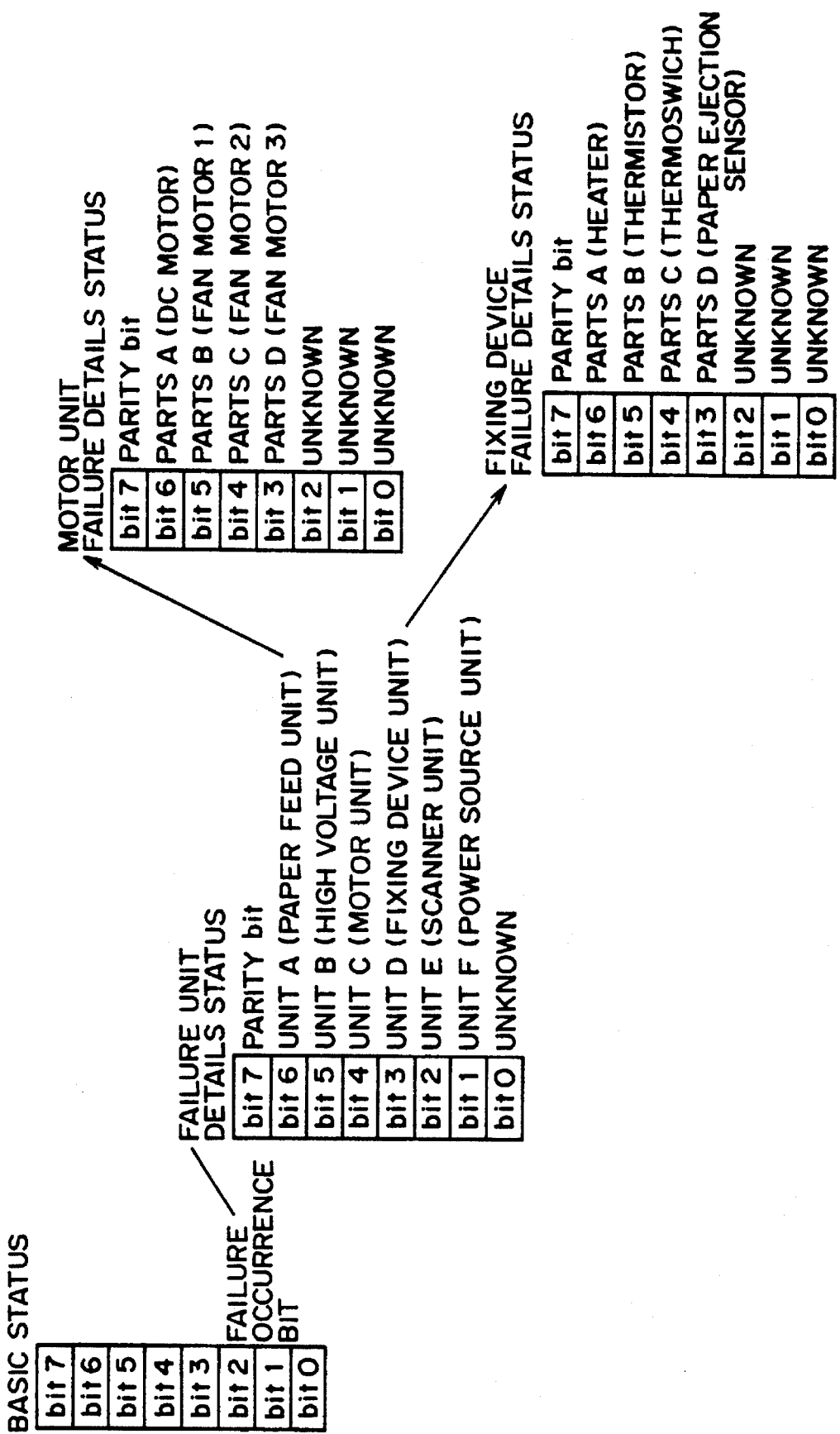
FIG. 3 is a view showing a status system of printer information in the first embodiment.

The status information of the printer 101 is informed to the controller 102 and the computer 105-1 for performing overall control of the service network according to the status system shown in FIG. 3. The status information of the printer includes the error status and failure status information of the printer 101, the current print count, the drive time of the printer 101, and the like.

When a failure occurs, the printer 101 transmits a failure occurrence bit on a basic status, a failure unit details status, and a failure unit details status of each unit, e.g., a motor unit or a fixing unit.

In addition, the printer 101 transmits the current print count and the drive time of the apparatus as status information. Each status consists of one- or two-byte data. The MSB of this data is used as a parity bit, and the remaining bits are used for status information. Using the rated life print count or life as a maximum value, this data is represented with a resolution of 128 values if the data consists of one byte, and is represented with a resolution of 16,384 values if the data consists of two bytes.

Actual failure predicting determination processing will be described below.

Figure 4:
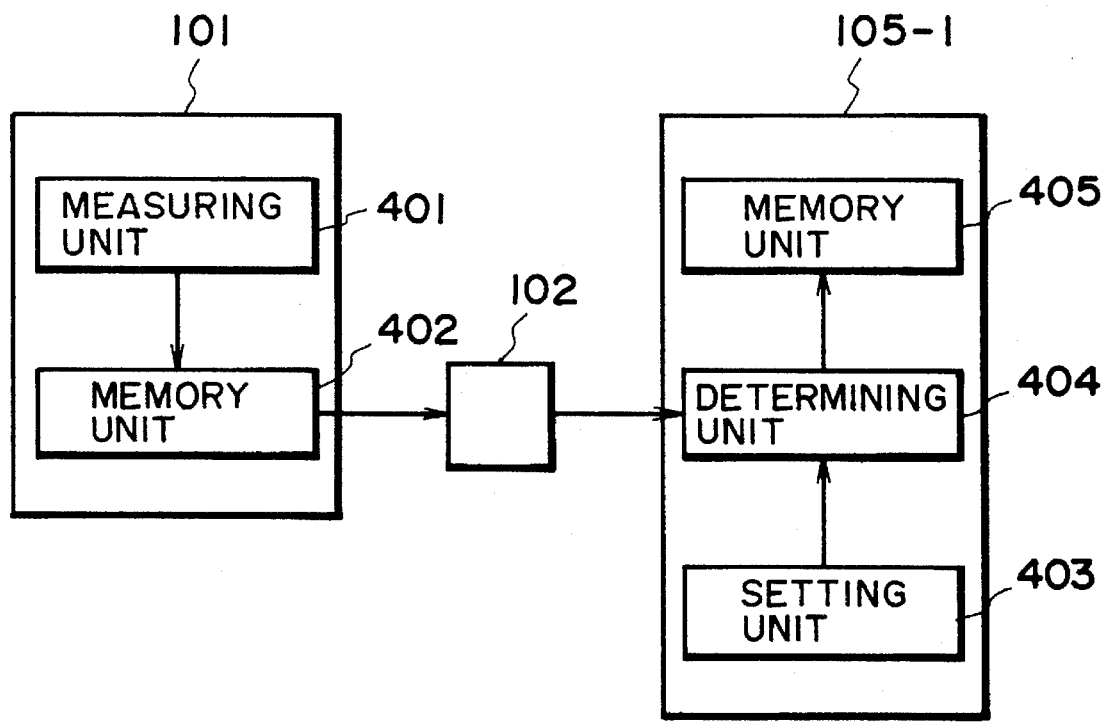
FIG. 4 is a block diagram showing an arrangement associated with failure prediction in the first embodiment.

FIG. 4 is a block diagram showing the printer 101 and the computer 105-1 to explain failure predicting determination processing. A measuring unit 401 measures the print count or ON time of the printer. The measuring unit 401 uses a counter to measure the print count, and uses a timer to measure the ON time.

The status information of the printer 101 which is measured by the measuring unit 401 is input to a memory unit 402 constituted by an EEPROM and the like. The memory unit 402 can store/hold data even when the power source is disconnected. Note that the memory unit 402 may be incorporated in the controller 102 in the computer 105-1.

The computer 105-1 includes a setting unit 403 for seating a numerical value indicating the exchange period for each exchange component (e.g., a fan motor or a fixing device). For example, 10,000 hours as an ON time or 100,000 sheets as a print count is set for the fan motor. A determining unit 404 compares each value in the setting unit 403 with a corresponding value in the memory unit 402 in the printer 101 to determine a failure.

As a result of this determination, if a given value in the memory unit 402 is larger than a corresponding value in the setting unit 403, the determining unit 404 determines that the corresponding exchange component has reached its exchange time. The determining unit 404 inputs this determination result to a memory unit 405.

With this arrangement, the exchange time of each exchange component can be assessed in advance to save any unnecessary time between the instant at which a failure is found and the instant at which the service engineer arrives at the place where the printer is installed.

In this embodiment, information associated with the exchange times of the fan motor, the fixing device, and the like is informed. As the information of this type, paper feed information (retry count information) may be informed instead of this exchange time information. Alternatively, the following operation may be performed. A CPU (not shown) of the printer 101 determines the time interval between a predetermined timing at which a pick-up operation is started and a timing at which a sheet is detected by a sensor for detecting the arrival of the sheet at a predetermined position. If the sensor detects no sheet after the elapse of a predetermined period of time, the CPU determines that a sheet is not properly picked up, and performs a paper feed operation again (retry). The CPU determines the presence of an abnormality in the paper feed system on the basis of the number of times this retry operation is performed, and informs the determination result. If the printer 101 is a laser printer, the laser driving current may be used as information from the printer 101.

Other combinations of printer information transmitted from the controller 102 and failure prediction contents transmitted from the computer 105-1 are conceivable. For example, in an electrophotographic printer of a horizontal scanning scheme using a polygon mirror and a thermal fixing scheme using a roller pair, the following combinations may be set:

(1) the rise time of a motor or the like and a motor failure;

(2) the time required for the standby operation of a fixing device and a fixing device failure;

(3) a control value associated with a high voltage (e.g., the transfer bias) and a high voltage unit failure; and (4) the frequency of occurrence of BD (beam detector) errors (that no horizontal sync signal can be caught in a predetermined interval) and a failure in a scanner/motor/drive circuit.

Figure 5:
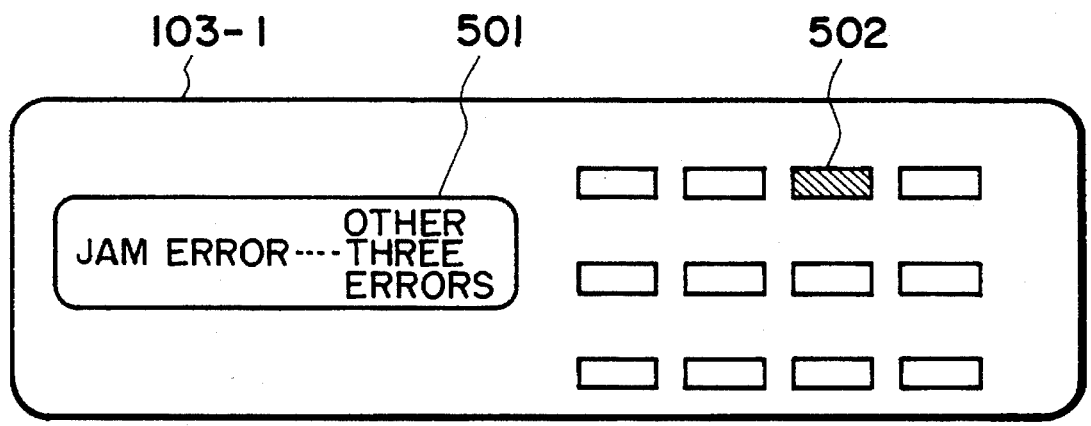
FIG. 5 is a view showing the arrangement of an MMI in the first embodiment.

FIG. 5 shows the MMI 103-1 in detail. Referring to FIG. 5, a display unit 501 is arranged in the MMI 103-1 to visually display operation contents, and an operation button 502 is arranged on an operation panel to be operated to perform a display switching operation. When a printing operation is stopped halfway upon occurrence of a plurality of failures, the main cause is displayed on the display unit 501, together with information indicating the presence of other failures.

When the printer user operates the operation button 502, the display unit 501 informs the user of the contents of the remaining errors.

As described above, according to this embodiment, the computer 105-1 performs failure prediction on the basis of information from the printer 101, and prediction contents are displayed on the MMI 103-1. In addition, the contents of the predicted failure and an image including a test pattern required to analyze the failure are printed out by the printer 101 in accordance with an indication from the controller 102. With this operation, the service engineer can perform accurate analysis associated with the failure and the service life as soon as he/she arrives the place where the printer is installed.

FIG. 6 shows an example of this test pattern. Since frequent retry operations for paper feed processing are detected, a message "EXCHANGE TIME OF PAPER FEED ROLLER IS DRAWING NEAR" and a test pattern for checking the state of the paper feed roller are printed out.

Second Embodiment

Figure 7:
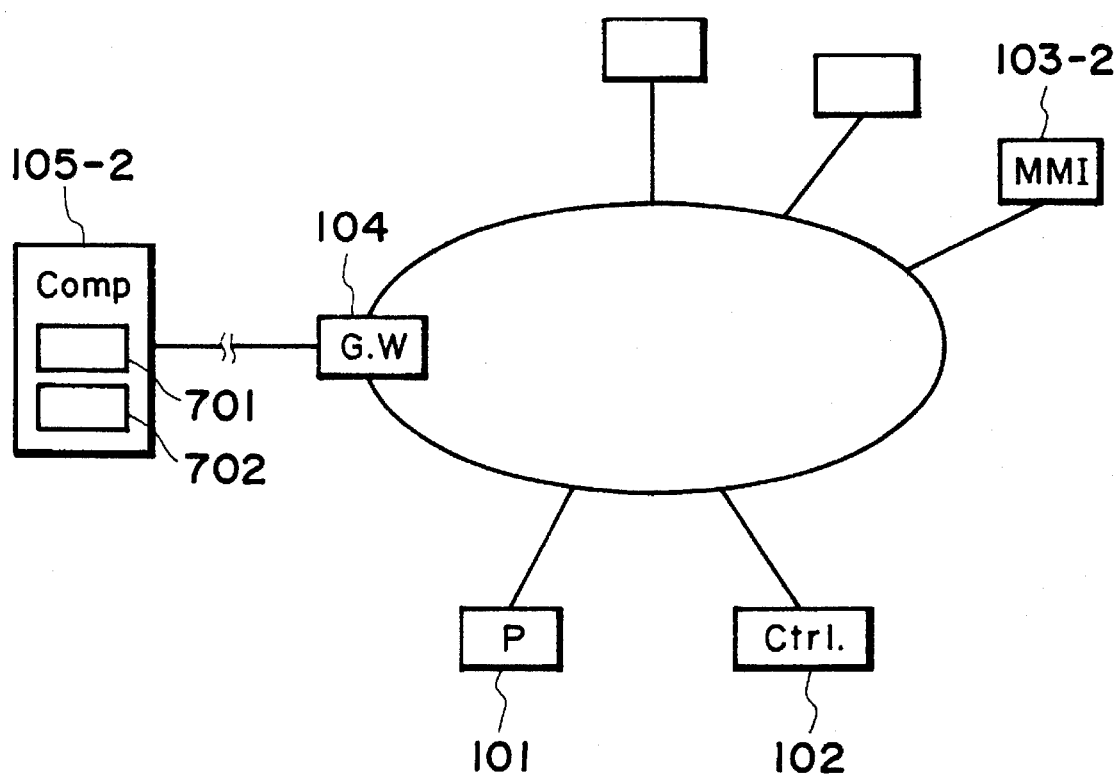
FIG. 7 is a block diagram showing the second embodiment of the present invention.
Figure 8:
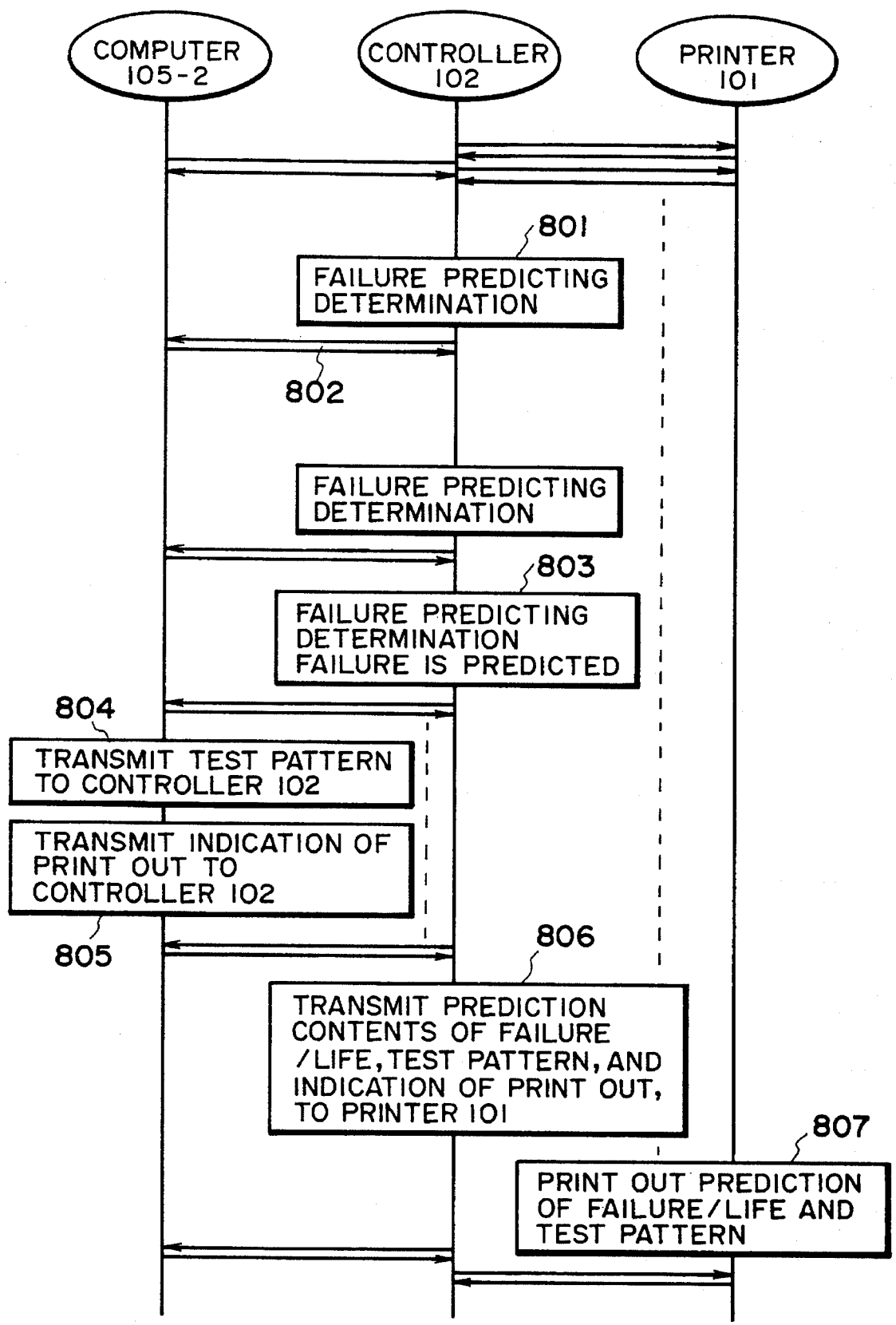
FIG. 8 is a view showing an example of communication between a computer, a controller and a printer in the second embodiment.

As shown in FIG. 7, the overall arrangement of the second embodiment is the same as that of the first embodiment. In the second embodiment, however, failure prediction is performed by a controller 102. FIG. 8 shows an example of communication between a computer 105-2, the controller 102, and a printer 101.

The arrangement and operation of this embodiment will be described with reference to FIGS. 7 and 8.

The controller 102 includes a printer state determining means to determine a printer state periodically, e.g., every hour or at intervals of a print count of 100 (step 801). The controller 102 informs the computer 105-2 of the determination result (step 802).

In this embodiment, since a test pattern including a complicated natural image is printed out, the image data cannot be stored in the controller 102 having a small memory capacity. For this reason, this image data is stored in the computer 105-2 (as indicated by reference numeral 701 in FIG. 7). The computer 105-2 also includes a means (702 in FIG. 7) for outputting an indication of print out. Such an indication is output under the control of the computer 105-2. When a failure is predicted (step 803), the computer 105-2 transmits a test pattern and an indication of print out to the controller 102 (steps 804 and 805) to cause the printer 101 to print out (steps 806 and 807).

In this embodiment, a natural image used as a test pattern is an image of the face of a man. A face image allows the service engineer to instantly check the output density state with a skin portion and the resolution and the contrast with a hair portion. Therefore, such a face image can be used for various types of failuresanalysis.

Figure 9:
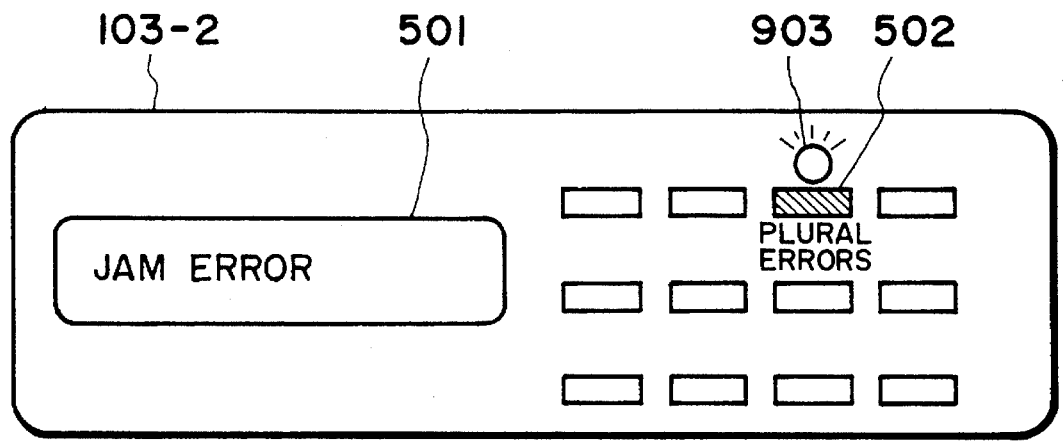
FIG. 9 is a view showing the arrangement of an MMI in the second embodiment.

FIG. 9 shows the arrangement of the MMI 103-2.

The same reference numerals in FIG. 9 denote the same parts as in the first embodiment. A display lamp 03 is arranged in an MMI 103-2 to visually display a predetermined display mode. When a printing operation is stopped halfway upon occurrence of a plurality of failures, the main cause is displayed on the display unit 501, together with information indicating the presence of other failures, which is informed by turning on the display lamp 903.

When the printer user operates the operation button 502, the display unit 501 informs the user of the contents of the remaining errors.

Note that the display lamp 903 may be flickered to inform the above information.

As is apparent from the above description, similar to the first embodiment, in this embodiment, the service engineer can perform accurate analysis associated with the failure and the service life, upon his/her arrival, on the basis of failure prediction contents and a test pattern which are printed out.

Third Embodiment

Figure 10:
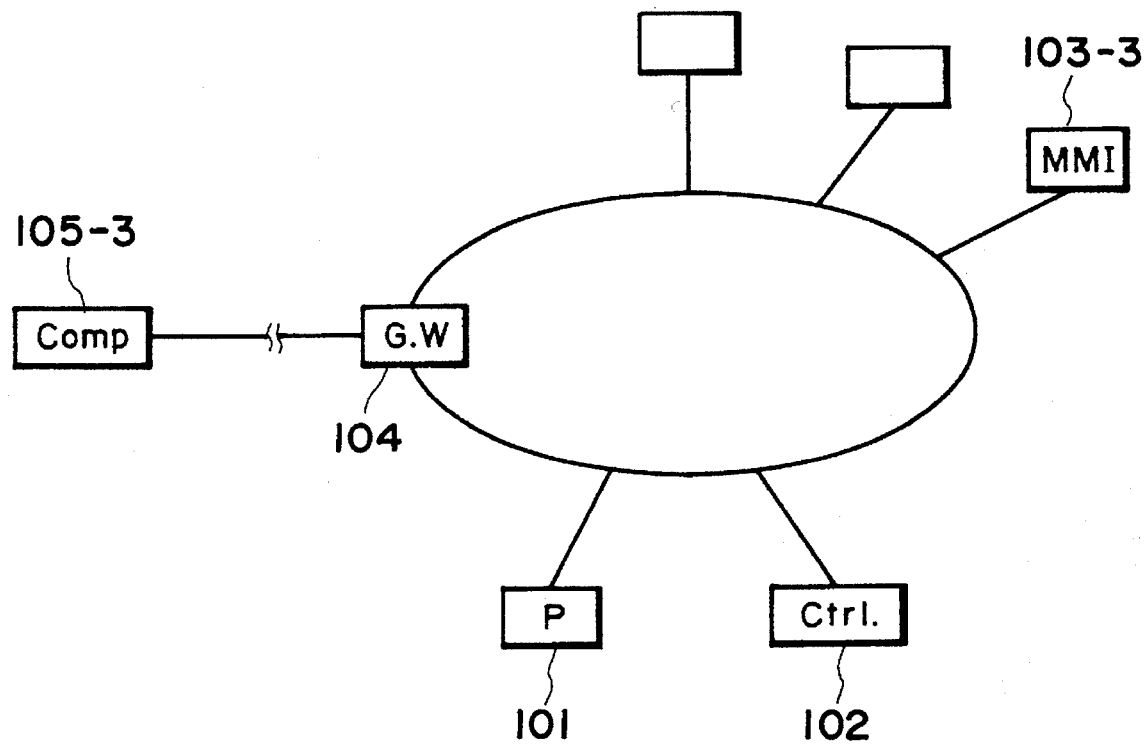
FIG. 10 is a block diagram showing the third embodiment of the present invention.

As shown in FIG. 10, the overall arrangement of the third embodiment is the same as that of the first embodiment.

According to this embodiment, there is provided a method which is effective for an abnormality in a computer 105-3 or an abnormality due to disconnection of a line between the computer 105-3 and a gateway 104.

Figure 11:
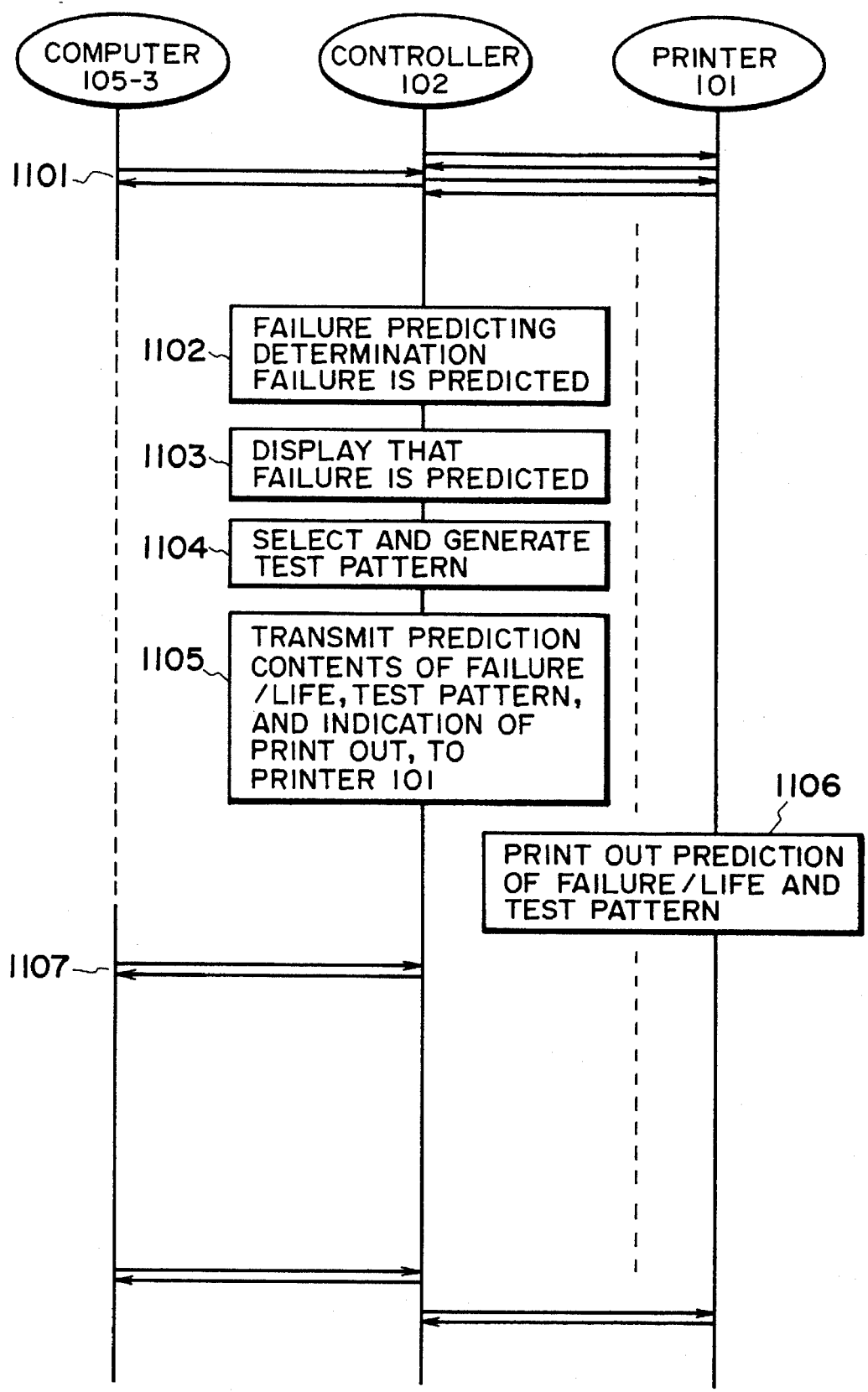
FIG. 11 is a view showing an example of communication between a computer, a controller and a printer in the third embodiment.

FIG. 11 shows an example of communication between the computer, the controller, and the printer.

In this embodiment, while the network is in an abnormal state (the interval between handshake processing in step 1101 to step 1107), a controller 102 performs failure predicting prediction, and stores the determination result for the preparation of network restoration (step 1102). At this time, the determination result is displayed on an MMI 103-3 (step 1103). After line restoration, the controller 102 informs the computer 105-3 that a failure has been predicted (step 1107). The computer 105-3 displays the corresponding information on an MMI (not shown) in the service center.

Figure 12:
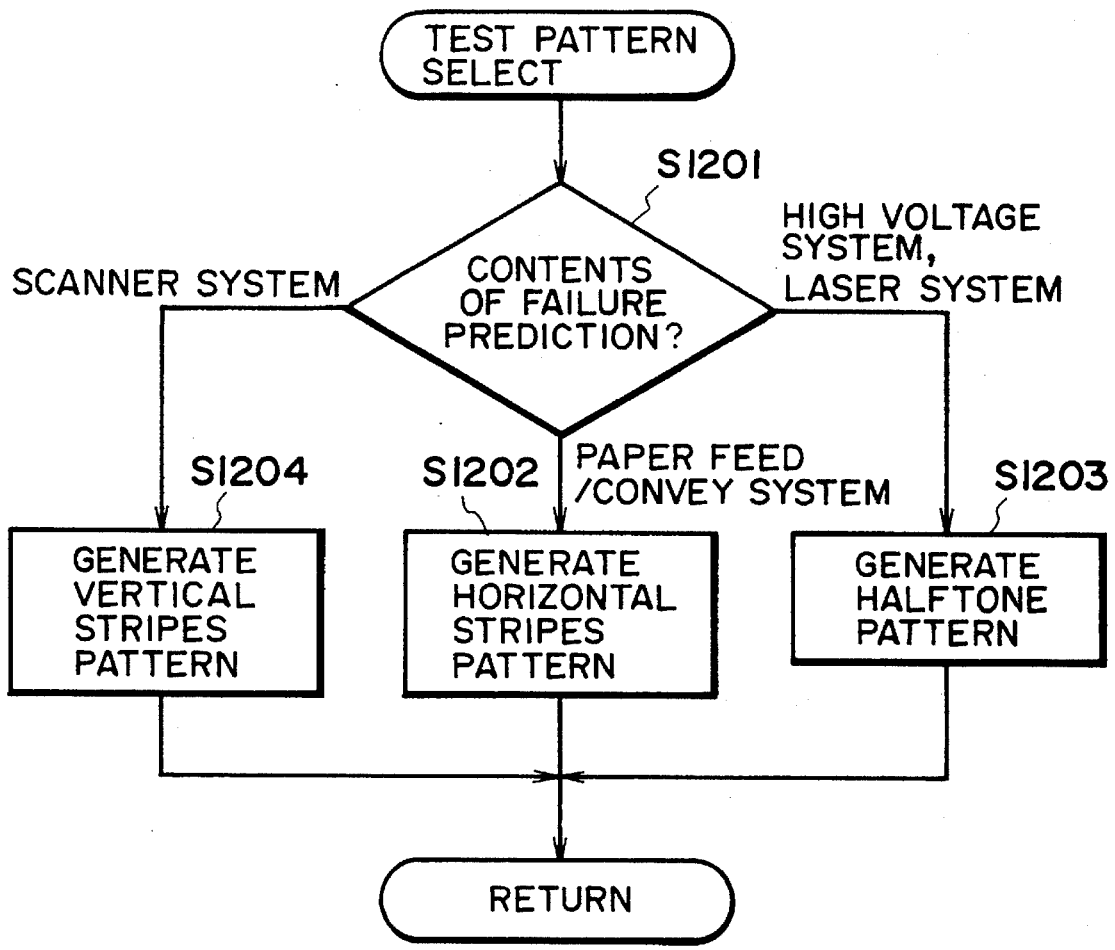
FIG. 12 is a flow chart showing test pattern selection processing in the third embodiment.

The controller 102 has a program shown in the flow chart of FIG. 12. When a failure is predicted, this program is started (step 1104 in FIG. 11). The controller 102 selects and generates a test pattern allowing an easy check on the corresponding situation (steps S1202, S1203, and S1204) in accordance with the contents of the predicted failure and service life (step S1201), thereby causing the printer 101 to print out the corresponding information (steps 1105 and 1106 in FIG. 11).

Figure 13B:
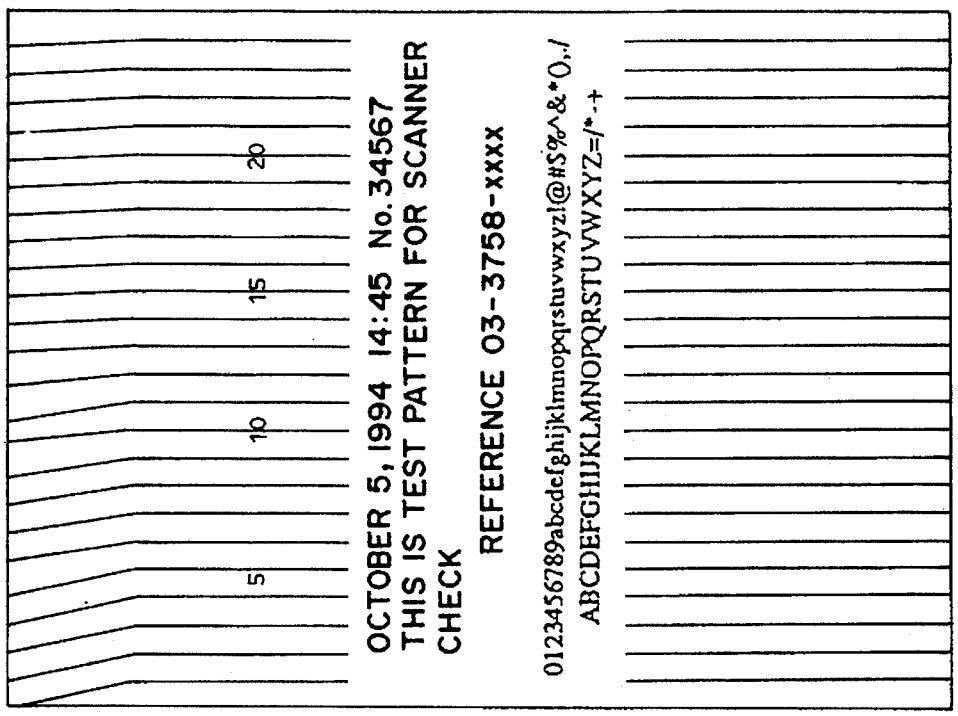
FIGS. 13A and 13B are views showing vertical stripes patterns used as test patterns in the third embodiment.
Figure 13A:
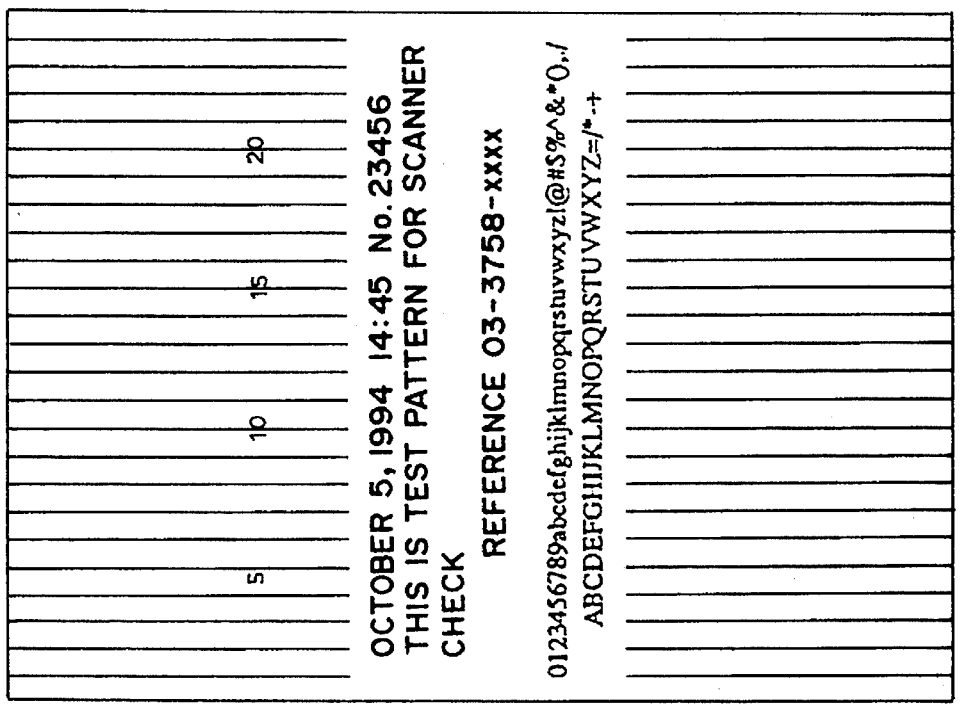

The vertical stripes patterns shown in FIGS. 13A and 13B are test patterns to be printed out when a failure in a scanner/motor/drive circuit in the laser printer 101 is predicted (step S1204). The upper end of each test pattern in the drawings is the leading end in the conveying direction. FIG. 13A shows an output sample in a normal state; and FIG. 13B, an output sample in an abnormal state. Such vertical stripes patterns are used because the rotation of the scanner is reflected in the line width. FIG. 13B shows a case wherein the scanner rotation is slowed down near the leading end of a print sheet.

The horizontal stripes patterns shown in FIGS. 14A and 14B are test patterns to be printed out when an abnormality associated with the wear or degree of expansion of a roller or the like of a convey system is predicted (step S1202). The upper end of each test pattern in the drawings is the leading end in the conveying direction. FIG. 14A shows an output sample in a normal state; and FIG. 14B, an output sample in an abnormal state. Horizontal stripes patterns are used as test patterns because the conveying speed is reflected in the line width. FIG. 14B shows a case wherein in an arrangement constituted by a registration roller, a transfer roller, and a fixing roller arranged on the convey path in the order named, after the trailing end of a print sheet passes through the registration roller, the conveying speed is increased owing to the influence of expansion of the fixing roller.

The halftone images shown in FIGS. 16A and 16B are test patterns to be printed out when a failure in a high voltage system is predicted (step S1203). The upper end of each test pattern in the drawings is the leading end in the conveying direction. FIG. 16 shows an output sample. Halftone images are used as test patterns because the degree of application of a transfer bias to a print sheet tends to be reflected in the density of an image. These halftones images permit us to know a state wherein in an arrangement constituted by a registration roller, a transfer roller, and a fixing roller arranged on the convey path in the order named, after the trailing end of a print sheet passes through the registration roller, the sheet cannot be brought into contact with the photosensitive drum because the user fails to mount the transfer roller, so that the failure to mount the transfer roller is reflected in an image having undergone an insufficient transfer operation. Note that in a system for applying a proper transfer bias by measuring the resistance of the transfer roller, the possibility of a mount failure of the transfer roller is predicted from an abnormality in the resistance of the transfer roller.

Figure 15A:
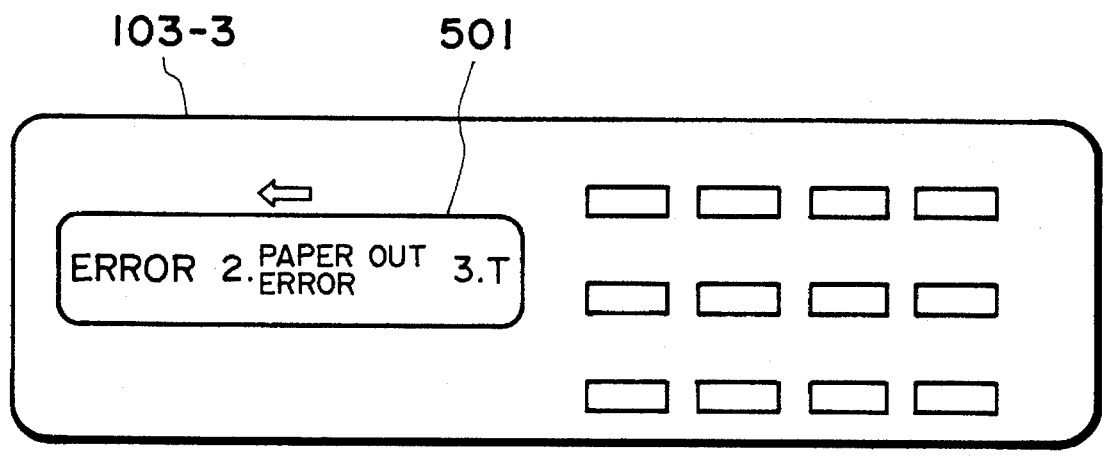
FIGS. 15A and 15B are views showing the arrangement and operation of an MMI in the third embodiment.
Figure 15B:
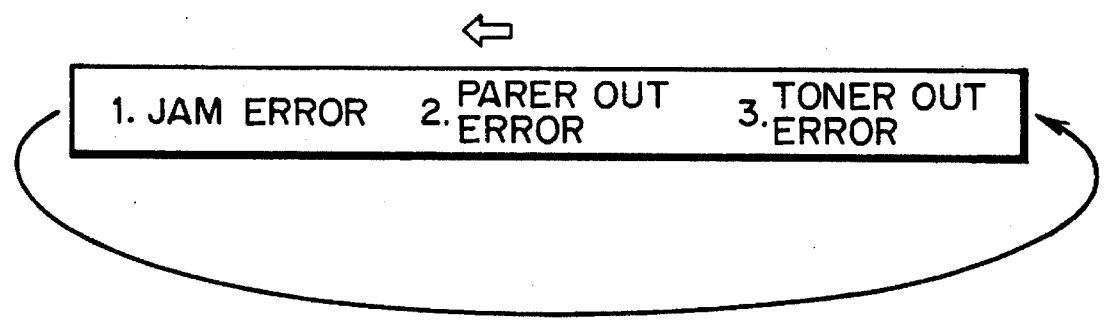

FIGS. 15A and 15B show the arrangement of the MMI 103-3.

The same reference numerals in FIGS. 15A and 15B denote the same parts as in the first embodiment. When a printing operation is stopped halfway upon occurrence of a plurality of failures, the contents of the failures are stored in a memory unit in a printer control unit (not shown), as shown in FIG. 15B, and periodically and automatically displayed on a display unit 501 at a predetermined speed.

Note that the contents indicating the main cause of the printer failure may be flickered to be emphatically displayed.

As is apparent from the above description, similar to the first embodiment, in this embodiment, the service engineer can perform accurate analysis associated with the failure and the service life, even if an abnormality occurs in the line between the computer and the gateway. Since a test pattern corresponding to failure prediction contents is printed out, more accurate analysis can be performed. In addition, the image data of the test patterns corresponding to the prediction contents described here may be held in not only the controller 102 but also the computer 105-3, and the test pattern data may be transmitted to be printed out in accordance with a prediction.

Fourth Embodiment

Figure 17:
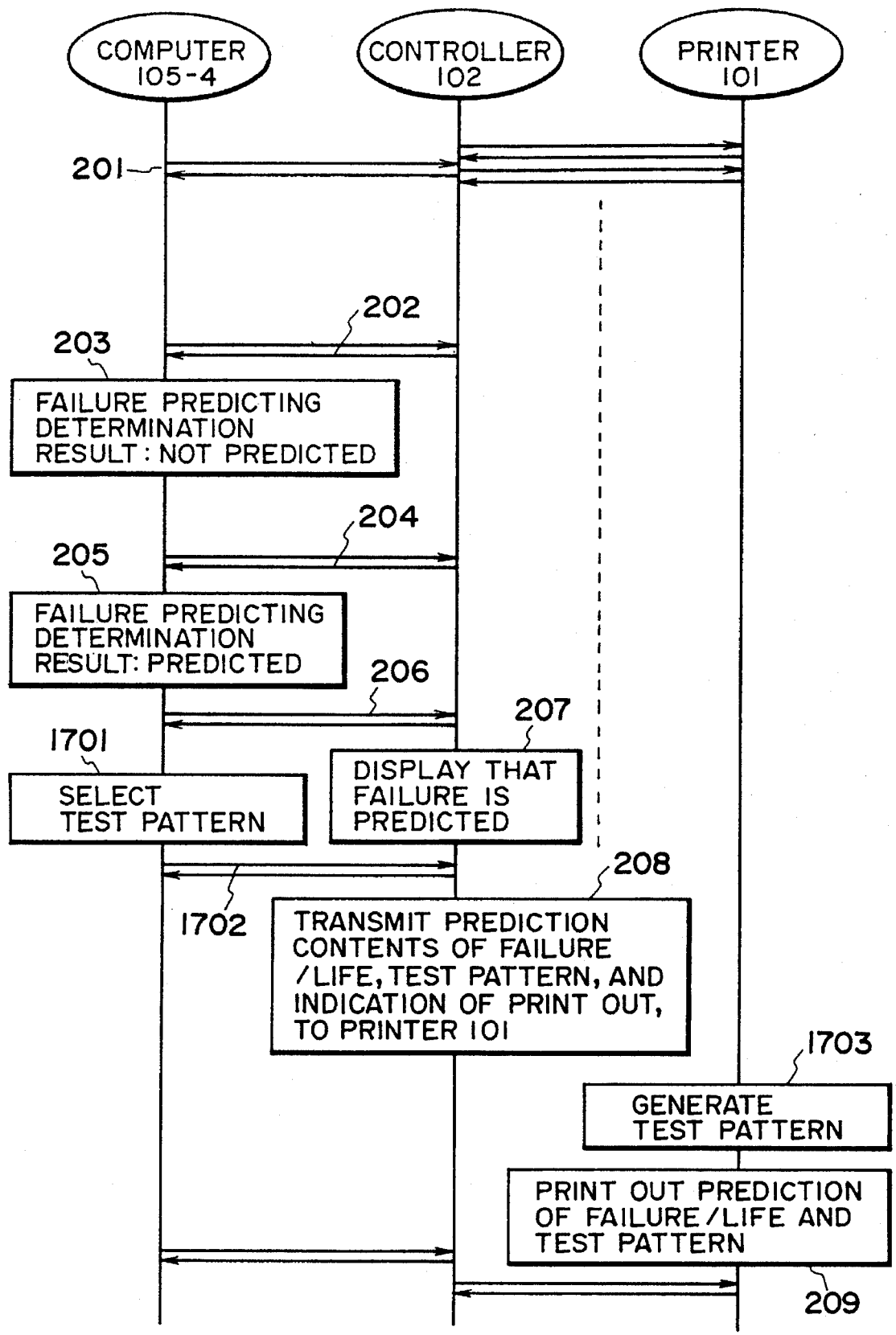
FIG. 17 is a view showing an example of communication between a computer, a controller and a printer in the fourth embodiment.

The fourth embodiment is an application of the first embodiment. FIG. 17 shows the contents of communication in this embodiment. The same reference numerals in the fourth embodiment denote the same parts as in the first embodiment. In step 1701, the type of an output image (FIG. 6, FIGS. 13A and 13B, FIGS. 14A and 14B, FIG. 16, or the like) is selected by a computer 105-4 (not shown). The computer 105-4 informs a controller 102 of the selected type (step 1702). A printer 101 generates an image in accordance with an indication 208 from the controller 102 (step 1703), and prints out the image (step 209).

Modification

In addition to the above embodiments, networks can be arranged in various forms. That is, versatility can be provided depending on the performance and arrangement of each node such as a controller, computer, or the like in a network. For example, the present invention can be realized in various forms such as the first and second embodiments depending on how a means associated with the determination of the state of a printer is arranged in each node. In addition, the present invention can be realized in a plurality of forms depending on the type of a distant station. For example, the present invention can be realized in such a manner that the printer 101 directly communicates with the computer 105 (not shown) unlike the first to third embodiments.

In addition, the present invention can be realized in the following manner. A computer is arranged near a printer. The computer performs failure prediction on the basis of information from the printer. When a failure is predicted, the computer generates a test pattern and outputs an indication to output the prediction contents and a hard copy of the test pattern from the printer.

As has been described above, when the controller or the computer predicts a failure, a test pattern for failure analysis transmitted from the controller or the computer is printed out from the printer in which the failure is predicted. For this reason, when the service engineer arrives at the place where the printer is installed, he/she can accurately analyze the situation of the printer from the printed test pattern, specify a failure, and repair the printer.

In addition, since the failure prediction program and various test pattern image data are stored in the controller or the computer, the memory capacity of the printer can be reduced. Therefore, a system with sufficient maintenance can be provided in spite of inexpensive printers.

In the above embodiments, the present invention is applied to the printers. As is apparent, however, the present invention can be applied to copying machines and facsimile systems as well.

What is claimed is:

1. A method of printing a test pattern, comprising the steps of:

determining a type of abnormality in a printer on the basis of status information of said printer; and causing said printer to print out a test pattern corresponding to the determined type of abnormality.

2. A method according to claim 1, wherein the determination step includes the step of receiving status information from said printer and determining a type of abnormality in said printer on the basis of the received status information.

3. A method according to claim 1, wherein the print step includes the step of selecting a test pattern corresponding to the determined type of abnormality from a plurality of test patterns stored in advance, and transmitting pattern data representing the selected test pattern to said printer.

4. A method according to claim 1, wherein said printer is an electrophotographic printer.

5. A method according to claim 4, wherein the test pattern includes a plurality of test patterns which are a vertical stripes pattern, a horizontal stripes pattern, and a halftone pattern.

6. A method according to claim 1, wherein the status information includes error information of said printer.

7. A method according to claim 1, wherein the status information includes information of the number of times of operations of said printer or information of an operation time thereof.

8. An apparatus for outputting a test pattern, comprising:

determining means for determining a type of abnormality in a printer on the basis of status information of said printer; and transmission means for transmitting a test pattern corresponding to the type of abnormality determined by said determining means to said printer and causing said printer to print out the test pattern.

9. An apparatus according to claim 8, further comprising reception means for receiving status information from said printer, and wherein said determining means determines a type of abnormality in said printer on the basis of the received status information received by said reception means.

10. An apparatus according to claim 9, wherein the test pattern includes a plurality of test patterns which are a vertical stripes pattern, a horizontal stripes pattern, and a halftone pattern.

11. An apparatus according to claim 8, further comprising selection means for selecting a test pattern corresponding to the determined type of abnormality from a plurality of test patterns stored in advance, and wherein said transmission means transmits pattern data representing the test pattern selected by said selection means to said printer.

12. An apparatus according to claim 8, wherein said printer is an electrophotographic printer.

13. An apparatus according to claim 8, wherein the status information includes error information of said printer.

14. An apparatus according to claim 8, wherein the status information includes information of the number of times of operations of said printer or information of an operation time thereof.

15. A method of printing a test pattern, comprising the steps of:

determining a type of abnormality in an image forming apparatus on the basis of status information of the image forming apparatus; and causing the image forming apparatus to form a test pattern corresponding to the determined type of abnormality.

16. An apparatus for outputting a test pattern, comprising:

determining means for determining a type of abnormality in an image forming apparatus on the basis of status information of the image forming apparatus; and transmission means for transmitting a test pattern corresponding to the determined type of abnormality determined by said determining means to the image forming apparatus and causing the image forming apparatus to form the test pattern as an image.

* * * * *

UNITED STATES PATENT AND TRADEMARK OFFICE
CERTIFICATE OF CORRECTION

PATENT NO. : 5,619,307

DATED : April 8, 1997

INVENTOR(S) : HITOSHI MACHINO, ET AL.

It is certified that error appears in the above-identified patent and that said Letters Patent is hereby corrected as shown below:

TITLE PAGE:

AT [73] ASSIGNEE

"Cannon Kabushiki Kaisha" should read --Canon Kabushiki Kaisha--.

IN THE DRAWINGS

Sheet 3 of 15, FIG. 3, "(THERMOSWICH)" should read --(THERMOSWITCH)--; and

Sheet 13 of 15, FIG. 15B, "PARER" should read --PAPER--.

COLUMN 2

Line 28, "as test patterns used" should read --used as test patterns--.

COLUMN 3

Line 66, "seating" should read --setting--.

COLUMN 5

Line 8, "he/she" should read --he or she--;
Line 49, "failuresanalysis." should read --failure analysis.--; and
Line 52, "lamp 03" should read --lamp 903--.

UNITED STATES PATENT AND TRADEMARK OFFICE
CERTIFICATE OF CORRECTION

PATENT NO. : 5,619,307

DATED : April 8, 1997

INVENTOR(S) : HITOSHI MACHINO, ET AL.

Page 2 of 2

It is certified that error appears in the above-identified patent and that said Letters Patent is hereby corrected as shown below:

<u>COLUMN 6</u>

Line 1, "his/her" should read --his or her--.

<u>COLUMN 8</u>

Line 14, "he/she" should read --he or she--.

Signed and Sealed this

Twenty-eighth Day of October, 1997

Attest:

BRUCE LEHMAN

*Attesting Officer*      Commissioner of Patents and Trademarks